(12) United States Patent
Abe et al.

(10) Patent No.: US 9,362,595 B2
(45) Date of Patent: Jun. 7, 2016

(54) NONAQUEOUS ELECTROLYTIC SOLUTION AND ENERGY STORAGE DEVICE USING SAME

(75) Inventors: Koji Abe, Ube (JP); Kazuhiro Miyoshi, Ube (JP); Yuichi Kotou, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 196 days.

(21) Appl. No.: 14/111,451

(22) PCT Filed: Mar. 26, 2012

(86) PCT No.: PCT/JP2012/057778
§ 371 (c)(1),
(2), (4) Date: Oct. 11, 2013

(87) PCT Pub. No.: WO2012/141001
PCT Pub. Date: Oct. 18, 2012

(65) Prior Publication Data
US 2014/0030609 A1    Jan. 30, 2014

(30) Foreign Application Priority Data

Apr. 11, 2011 (JP) ................................. 2011-087798

(51) Int. Cl.
| | |
|---|---|
| H01M 10/056 | (2010.01) |
| H01M 10/0567 | (2010.01) |
| H01M 10/0569 | (2010.01) |
| H01M 10/0525 | (2010.01) |
| H01G 11/06 | (2013.01) |
| H01G 11/60 | (2013.01) |
| H01M 10/48 | (2006.01) |
| H01G 11/64 | (2013.01) |

(52) U.S. Cl.
CPC ........... *H01M 10/0569* (2013.01); *H01G 11/06* (2013.01); *H01G 11/60* (2013.01); *H01M 10/0525* (2013.01); *H01M 10/0567* (2013.01); *H01G 11/64* (2013.01); *H01M 10/48* (2013.01); *H01M 2200/20* (2013.01); *Y02E 60/122* (2013.01); *Y02E 60/13* (2013.01); *Y02T 10/7011* (2013.01); *Y02T 10/7022* (2013.01)

(58) Field of Classification Search
None
See application file for complete search history.

(56) References Cited

U.S. PATENT DOCUMENTS

| | | | |
|---|---|---|---|
| 2008/0241702 | A1* | 10/2008 | Takahashi ...................... 429/332 |
| 2009/0087752 | A1 | 4/2009 | Takahashi |
| 2009/0170007 | A1 | 7/2009 | Takahashi |
| 2011/0269028 | A1 | 11/2011 | Takahashi |
| 2012/0021296 | A1 | 1/2012 | Funada et al. |

FOREIGN PATENT DOCUMENTS

| | | |
|---|---|---|
| JP | 8 096848 | 4/1996 |
| JP | 9 147910 | 6/1997 |
| JP | 2003 243027 | 8/2003 |
| JP | 2003 272956 | 9/2003 |
| JP | 2005 174945 | 6/2005 |
| JP | 2007 242496 | 9/2007 |
| JP | 2007 258101 | 10/2007 |
| JP | 2008 243642 | 10/2008 |
| JP | 2009 087647 | 4/2009 |
| JP | 2009 163937 | 7/2009 |
| JP | 2009 301954 | 12/2009 |
| JP | 2012 018796 | 1/2012 |

OTHER PUBLICATIONS

International Search Report Issued Jun. 2012 in PCT/JP12/057778 Filed Mar. 26, 2012.

\* cited by examiner

*Primary Examiner* — Cynthia K Walls
(74) *Attorney, Agent, or Firm* — Oblon, McClelland, Maier & Neustadt, L.L.P.

(57) ABSTRACT

The present invention is to provide a nonaqueous electrolytic solution prepared by dissolving an electrolyte salt in a nonaqueous solvent, wherein the nonaqueous solvent includes 0.01 to 40% by volume of an ester having two alkyl groups at the α-position carbon of the carbonyl group and being represented by the following general formula (I), and an energy storage device.

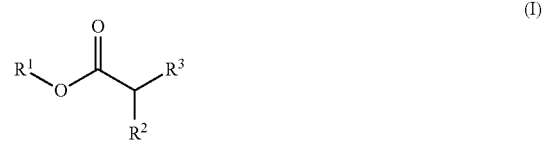

(I)

(in the above formula, $R^1$ is an alkyl group, an alkenyl group or an alkynyl group in which at least one of the hydrogen atoms may be substituted with a halogen atom, $R^2$ and $R^3$ are an alkyl group in which at least one of the hydrogen atoms may be substituted with a halogen atom, and $R^2$ and $R^3$ may be linked to each other to form a ring. However, when $R^2$ and $R^3$ do not form a ring, $R^3$ is an alkyl group in which at least one of the hydrogen atoms may be substituted with a halogen atom.).

15 Claims, No Drawings

NONAQUEOUS ELECTROLYTIC SOLUTION AND ENERGY STORAGE DEVICE USING SAME

TECHNICAL FIELD

The present invention relates to a nonaqueous electrolytic solution that can improve the electrochemical properties in a broad temperature range and an energy storage device using the same.

BACKGROUND ART

In recent years, an energy storage device, particularly a lithium secondary battery is widely used for a small-sized electronic equipment such as a cellular phone and a laptop computer, an electric vehicle or storage of the electric power. These electronic equipments or a vehicle is likely to be used in a broad temperature range of high temperature in the midsummer, low temperature in the arctic weather etc., and thus it is required to improve the electrochemical properties in a broad temperature range with a good balance.

Particularly in order to prevent global warming, it is urgently needed to cut $CO_2$ discharge, and immediate diffusion of a hybrid electric vehicle (HEV), a plug-in hybrid electric vehicle (PHEV), or a battery electric vehicle (BEV) is demanded, among environment-friendly cars loaded with an energy storage device including an energy storage device such as a lithium secondary battery and a capacitor. However, a vehicle has long migration length, and thus is likely used in a region of broad temperature range from tropical, very hot region to arctic weather region. Accordingly, these energy storage devices for a vehicle are demanded to have no deterioration for the electrochemical properties even when used in a broad temperature range from high temperature to low temperature.

Note that, in the present description, the term of the lithium secondary battery is used as a concept including the so-called lithium ion secondary battery.

A lithium secondary battery mainly consists of a positive electrode and a negative electrode containing materials which can absorb and release lithium, and a nonaqueous electrolytic solution including a lithium salt and a nonaqueous solvent, and as the nonaqueous solvent, a carbonate such as ethylene carbonate (EC) and propylene carbonate (PC) is used.

Further, as the negative electrode, metal lithium, and a metal compound (metal element, oxide, alloy with lithium, etc.) and a carbon material which can absorb and release lithium are known. Particularly, lithium secondary battery produced by using a carbon material, such as coke, artificial graphite, natural graphite and the like which can absorb and release lithium are widely put into practical use.

In a lithium secondary battery produced by using, for example, highly crystallized carbon materials, such as artificial graphites, natural graphites and the like as a negative electrode material, it is known that decomposed products and gases generated from a solvent in a nonaqueous electrolytic solution which is reduced and decomposed on a surface of a negative electrode in charging the battery detract from a desired electrochemical reaction of the battery, so that a cycle property thereof is worsened. Also, when the decomposed products of the nonaqueous solvent are deposited, lithium can not smoothly be absorbed onto and released from a negative electrode, and the electrochemical characteristics thereof are liable to be worsened in a broad temperature range.

Further, in a lithium secondary battery produced by using lithium metal and alloys thereof, metal element, such as tin, silicon and the like and oxides thereof as a negative electrode material, it is known that an initial battery capacity thereof is high but a nonaqueous solvent is acceleratingly reduced and decomposed as compared with a negative electrode of a carbon material since a micronized powdering of the material is promoted during cycles and that battery performances, such as a battery capacity and a cycle property are worsened to a large extent. Also, in a case the micronized powdering of the negative electrode material and the deposition of the decomposed products of the nonaqueous solvent are deposited, lithium can not smoothly be absorbed onto and released from the negative electrode, and the electrochemical characteristics thereof are liable to be worsened in a broad temperature range.

On the other hand, in a lithium secondary battery produced by using, for example, $LiCoO_2$, $LiMn_2O_4$, $LiNiO_2$, $LiFePO_4$ and the like as a positive electrode, it is known that decomposed products and gases generated from a solvent in a nonaqueous electrolytic solution which is partially oxidized and decomposed in a local part on an interface between the positive electrode material and the nonaqueous electrolytic solution in a charging state detract from a desired electrochemical reaction of the battery, so that the electrochemical characteristics thereof are worsened as well in a broad temperature range.

As described above, the decomposed products and gases generated when a nonaqueous electrolytic solution is decomposed on a positive electrode or a negative electrode may interfere with a migration of lithium ions or may swell the battery, and the battery performance is thereby worsened. In spite of the above situations, electronic equipments in which a lithium secondary battery are mounted are advanced more and more in multi-functionalization and tend to be increased in an electric power consumption. As a result thereof, a lithium secondary battery are advanced more and more in an elevation of a capacity, and a nonaqueous electrolytic solution is reduced in a volume thereof occupied in the battery, wherein the electrode is increased in a density, and a useless space volume in the battery is reduced. Accordingly, observed is a situation in which the electrochemical characteristics thereof in a broad temperature range are liable to be worsened by decomposition of only a small amount of the nonaqueous electrolytic solution.

Patent Document 1 discloses a lithium secondary cell using a nonaqueous electrolytic solution containing ethylene carbonate, chain carbonate and a carboxylic acid ester compound having 6 or more of the total carbon number, and further containing at least one kind of compounds selected from the group consisting of a cyclic carbonate compound having a carbon-carbon unsaturated bond, a cyclic carbonate compound having a fluorine atom, monofluorophosphate and difluorophosphate, which can suppress deterioration of the cell properties after storage at high temperature.

PRIOR ART DOCUMENTS

Patent Documents

Patent Document 1: Japanese Patent Publication No. 2010-165653

SUMMARY OF THE INVENTION

Problem to be Solved by the Invention

The object of the present invention is to provide a nonaqueous electrolytic solution that can improve the electrochemical properties in a broad temperature range and an energy storage device using the same.

Means for Solving the Problems

The present inventors investigated in detail, the performances of the nonaqueous electrolytic solution of the prior arts described above. As a result, it cannot be said in the actual circumstances that the nonaqueous electrolytic solutions of the above Patent Document can sufficiently solve the objects of improving electrochemical properties in a broad temperature range such as low temperature cycle properties and high temperature cycle properties.

Upon this, the present inventors have repeated the researches earnestly to solve the problems, and found that the electrochemical properties, particularly the electrochemical properties of a lithium cell in a broad temperature range, can be improved by means of a nonaqueous electrolytic solution in which an electrolyte salt is dissolved in a nonaqueous solvent, and which contains 0.01 to 40% by volume of a specific ester having two alkyl groups at the α-position carbon of the carbonyl group. Thus, the inventors completed the present invention.

Specifically, the present invention provides (1) to (5) to be described below.

(1) A nonaqueous electrolytic solution prepared by dissolving an electrolyte salt in a nonaqueous solvent, wherein the nonaqueous solvent contains 0.01 to 40% by volume of an ester having two alkyl groups at the α-position carbon of the carbonyl group and being represented by the following general formula (I).

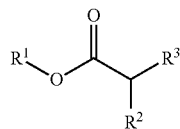

(I)

(wherein, $R^1$ is a $C_1$ to $C_6$ alkyl group, a $C_2$ to $C_6$ alkenyl group or a $C_2$ to $C_6$ alkynyl group in which at least one of the hydrogen atoms may be substituted with a halogen atom, and $R^2$ and $R^3$ are a $C_1$ to $C_6$ alkyl group in which at least one of the hydrogen atoms may be substituted with a halogen atom, and $R^2$ and $R^3$ may be linked to each other to form a ring. However, when $R^2$ and $R^3$ do not form a ring, $R^3$ is a $C_2$ to $C_6$ alkyl group in which at least one of the hydrogen atoms may be substituted with a halogen atom.)

(2) The nonaqueous electrolytic solution described in (1), wherein the structure of the ring is a 3- to 9-membered ring structure when $R^2$ and $R^3$ which constitute the ester having two alkyl groups at the α-position carbon of the carbonyl group represented by the general formula (I), are linked to each other to form a ring, and the total carbon number of $R^2$ and $R^3$ is 4 to 8 when $R^2$ and $R^3$ do not form a ring.

(3) The nonaqueous electrolytic solution described in (1) or (2), wherein the nonaqueous solvent further contains a tertiary carboxylic acid ester.

(4) The nonaqueous electrolytic solution described in (3), wherein the nonaqueous solvent further contains chain carbonate, and the content of the tertiary carboxylic acid ester is larger than the content of the chain carbonate.

(5) An energy storage device including a positive electrode, a negative electrode and a nonaqueous electrolytic solution prepared by dissolving an electrolyte salt in a nonaqueous solvent, wherein the nonaqueous electrolytic solution is the nonaqueous electrolytic solutions described in any one of (1) to (4).

Effects of the Invention

According to the present invention, it is possible to provide a nonaqueous electrolytic solution that can improve electrochemical properties in a broad temperature range, particularly electrochemical properties in a broad temperature range, and an energy storage device such as a lithium cell using the same.

DESCRIPTION OF EMBODIMENTS

The present invention relates to a nonaqueous electrolytic solution and an energy storage device using the same.

[Nonaqueous Electrolytic Solution]

The nonaqueous electrolytic solution of the present invention is a nonaqueous electrolytic solution in which an electrolyte salt is dissolved in a nonaqueous solvent, and which contains 0.01 to 40% by volume of a specific ester having two alkyl groups at the α-position carbon of the carbonyl group.

The reasons that the nonaqueous electrolytic solution of the present invention can drastically improve the electrochemical properties in a broad temperature range are not necessarily clear, but the followings are considered.

In the ester having two alkyl groups at the α-position carbon of the carbonyl group represented by the general formula (I) contained in the nonaqueous electrolytic solution of the present invention, at least one of the two alkyl groups bonded at the α-position carbon has 2 or more of the carbon number, and thus the methine structure ($—CHR^2R^3$) of the α position carbon is electrochemically stabilized by the electron donation effect of the two alkyl groups bonded at the α-position carbon. Particularly, when the total carbon number of the two alkyl groups bonded at the α-position carbon is 4 or more, the stability is further improved. In addition, when the two alkyl groups bonded at the α-position carbon are linked to each other to form a ring, the methine structure ($—CHR^2R^3$) of the α position carbon is electrochemically stabilized by deformation of the ring structure even when the total carbon number of the two alkyl groups bonded at the α-position carbon is less than 4. Accordingly, the ester having two alkyl groups at the α-position carbon of the carbonyl group represented by the above general formula (I) has high electrochemical stability, and is slightly decomposed on the negative electrode at the time of the first charge, and forms a coating film having a low resistance. Therefore, it is understood that increase of the resistance involved with the charge-discharge cycle is suppressed in a broad temperature range from a low temperature to a high temperature, and the electrochemical properties are prominently improved.

In the nonaqueous electrolytic solution of the present invention, the content of the ester having two alkyl groups at the α-position carbon of the carbonyl group represented by the general formula (I) contained in the nonaqueous electrolytic solution is preferably 0.01 to 40% by volume. If the content is 40% by volume or less, the fear of the decline of the electrochemical properties in a broad temperature range due to too high viscosity of the nonaqueous electrolytic solution is small. In addition, if the content is 0.01% by volume or more, the effects of improving the electrochemical properties in a broad temperature range increase. The content is preferably 0.01% by volume or more, more preferably 0.1% by volume or more, and further preferably 1% volume or more in the nonaqueous electrolytic solution. In addition, the upper limit thereof is preferably 40% by volume or less, and more preferably 30% by volume or less.

In the ester having two alkyl groups at the α-position carbon of the carbonyl group represented by the general formula (I), $R^1$ represents a $C_1$ to $C_6$ alkyl group, a $C_2$ to $C_6$ alkenyl group or a $C_2$ to $C_6$ alkynyl group in which at least one of the hydrogen atoms may be substituted with a halogen atom. As a specific example of $R^1$, a linear alkyl group such as a methyl group, an ethyl group, an n-propyl group, an n-butyl group, an n-pentyl group and an n-hexyl group, a branched alkyl group such as an iso-propyl group, a sec-butyl group, a tert-butyl group and a tert-amyl group, an alkyl group in which some of the hydrogen atoms are substituted with a fluorine atom such as a fluoromethyl group, a trifluoromethyl group and a 2,2,2-trifluoroethyl group, an alkenyl group such as a vinyl group, a 1-propenyl group, a 2-propenyl group, a 1-methyl-2-propenyl group, a 1,1-dimethyl-2-propenyl group, 1-butenyl group, a 2-butenyl group, a 3-butenyl group, a 1-pentenyl group and a 1-hexenyl group, an alkynyl group such as an ethynyl group, a 2-propynyl group, a 2-butynyl group, a 3-butyryl group, a 4-pentynyl group, a 5-hexynyl group, a 1-methyl-2-propynyl group, a 1-methyl-2-butyryl group and a 1,1-dimethyl-2-propynyl group, etc. may be suitably mentioned. Among these, a methyl group, an ethyl group, an n-propyl group, an n-butyl group, a fluoromethyl group, a trifluoromethyl group, a 2,2,2-trifluoroethyl group, a 2-propenyl group and a 2-propynyl group are preferable, and a methyl group, an ethyl group and a 2-propynyl group are further preferable.

$R^2$ and $R^3$ represented by the general formula (I) represent a $C_1$ to $C_6$ alkyl group in which at least one of the hydrogen atoms may be substituted with a halogen atom, and $R^2$ and $R^3$ may be linked to each other to form a ring.

When $R^2$ and $R^3$ form a ring, the structure of the ring is preferably a 3- to 9-membered ring, and particularly preferably a 4- to 8-membered ring.

When $R^2$ and $R^3$ do not form a ring, $R^3$ represents a $C_2$ to $C_6$ alkyl group in which at least one of the hydrogen atoms may be substituted with a halogen atom, and the total carbon number of $R^2$ and $R^3$ is preferably in a range of 4 to 8, and more preferably in a range of 5 to 7. In addition, either one of $R^2$ and $R^3$ is further preferably an alkyl group having 2 or more of the carbon number, and particularly preferably, either one of $R^2$ and $R^3$ is an alkyl group having 2 or more of the carbon number, and $R^2$ and $R^3$ are the same group to each other.

The above-mentioned case is preferable because the electrochemical properties improves in a further broader temperature range.

As a specific example of $R^2$ and $R^3$, a linear alkyl group such as a methyl group, an ethyl group, an n-propyl group and an n-butyl group, a branched alkyl group such as an iso-propyl group, a sec-butyl group, and a tert-butyl group, alkyl in which some of the hydrogen atoms are substituted with a fluorine atom such as a fluoromethyl group, a trifluoromethyl group, a 2-fluoroethyl group, a 2,2,2-trifluoroethyl group and a 3,3,3-trifluoropropyl group, etc. may be suitably mentioned. Among these, an ethyl group, an n-propyl group, an n-butyl group, a fluoromethyl group, a trifluoromethyl group, a 2-fluoroethyl group, a 2,2,2-trifluoroethyl group and a 3,3,3-trifluoropropyl group are preferable, and an ethyl group, an n-propyl group are an n-butyl group further preferable.

In addition, as a specific example of $-CHR^2R^3$ when $R^2$ and $R^3$ form a ring in the ester having two alkyl groups at the α-position carbon of the carbonyl group represented by the general formula (I) in the present invention,
a cyclopropyl group, a cyclobutyl group, a cyclopentyl group, a cyclohexyl group, a 2-methylcyclohexyl group, a 4-methylcyclohexyl group, a 4-fluorocyclohexyl group, a 3-trifluoromethylcyclohexyl group, a 4-trifluoromethylcyclohexyl group, a cycloheptyl group, a cyclooctyl group, a cyclononyl group, etc. may be suitably mentioned. A cyclopropyl group, a cyclohexyl group, a cyclobutyl group and a cyclopentyl group are preferable, and a cyclopropyl group and a cyclohexyl group are further preferable.

As the specific compound when $R^2$ and $R^3$ form a ring in the ester having two alkyl groups at the α-position carbon of the carbonyl group represented by the general formula (I), methyl cyclopropanecarboxylate, ethyl cyclopropanecarboxylate, vinyl cyclopropanecarboxylate, 2-propenyl cyclopropanecarboxylate, 2-propynyl cyclopropanecarboxylate, methyl cyclobutanecarboxylate, ethyl cyclobutanecarboxylate, vinyl cyclobutanecarboxylate, 2-propenyl cyclobutanecarboxylate, 2-propynyl cyclobutanecarboxylate, methyl cyclopentanecarboxylate, ethyl cyclopentanecarboxylate, vinyl cyclopentanecarboxylate, 2-propenyl cyclopentanecarboxylate, 2-propynyl cyclopentanecarboxylate, methyl cyclohexanecarboxylate, ethyl cyclohexanecarboxylate, propyl cyclohexanecarboxylate, butyl cyclohexanecarboxylate, 2,2,2-trifluoroethyl cyclohexanecarboxylate, vinyl cyclohexanecarboxylate, 2-propenyl cyclohexanecarboxylate, 2-propynyl cyclohexanecarboxylate, methyl 2-methylcyclohexanecarboxylate, ethyl 2-methylcyclohexanecarboxylate, vinyl 2-methylcyclohexanecarboxylate, 2-propenyl 2-methylcyclohexanecarboxylate, 2-propynyl 2-methylcyclohexanecarboxylate, methyl 4-methylcyclohexanecarboxylate, ethyl 4-methylcyclohexanecarboxylate, vinyl 4-methylcyclohexanecarboxylate, 2-propenyl 4-methylcyclohexanecarboxylate, 2-propynyl 4-methylcyclohexanecarboxylate, methyl 4-fluorocyclohexanecarboxylate, ethyl 4-fluorocyclohexanecarboxylate, vinyl 4-fluorocyclohexanecarboxylate, 2-propenyl 4-fluorocyclohexanecarboxylate, 2-propynyl 4-fluorocyclohexanecarboxylate, methyl 4-fluoromethylcyclohexanecarboxylate, ethyl 4-fluoromethylcyclohexanecarboxylate, vinyl 4-fluoromethylcyclohexanecarboxylate, 2-propenyl 4-fluoromethylcyclohexanecarboxylate, 2-propynyl 4-fluoromethylcyclohexanecarboxylate, methyl 3-trifluoromethylcyclohexanecarboxylate, ethyl 3-trifluoromethylcyclohexanecarboxylate, vinyl 3-trifluoromethylcyclohexanecarboxylate, 2-propenyl 3-trifluoromethylcyclohexanecarboxylate, 2-propynyl 3-trifluoromethylcyclohexanecarboxylate, methyl 4-trifluoromethylcyclohexanecarboxylate, ethyl 4-trifluoromethylcyclohexanecarboxylate, vinyl 4-trifluoromethylcyclohexanecarboxylate, 2-propenyl 4-trifluoromethylcyclohexanecarboxylate, 2-propynyl 4-trifluoromethylcyclohexanecarboxylate, methyl cycloheptanecarboxylate, ethyl cycloheptanecarboxylate, vinyl cycloheptanecarboxylate, 2-propenyl cycloheptanecarboxylate, 2-propynyl cycloheptanecarboxylate, methyl cyclooctanecarboxylate, ethyl cyclooctanecarboxylate, vinyl cyclooctanecarboxylate, 2-propenyl cyclooctanecarboxylate, 2-propynyl cyclooctanecarboxylate, methyl cyclononanecarboxylate, ethyl cyclononanecarboxylate, vinyl cyclononanecarboxylate, 2-propenyl cyclononanecarboxylate and 2-propynyl cyclononanecarboxylate may be suitably mentioned.

Among these, methyl cyclopropanecarboxylate, ethyl cyclopropanecarboxylate, 2-propynyl cyclopropanecarboxylate, methyl cyclobutanecarboxylate, ethyl cyclobutanecarboxylate, 2-propynyl cyclobutanecarboxylate, methyl cyclopentanecarboxylate, ethyl cyclopentanecarboxylate, 2-propynyl cyclopentanecarboxylate, methyl cyclohexanecarboxylate, ethyl cyclohexanecarboxylate, propyl cyclohexanecarboxylate, butyl cyclohexanecarboxylate, hexyl cyclohexanecarboxylate, 2,2,2-trifluoroethyl cyclohexanecarboxylate, 2-propynyl cyclohexanecarboxylate, methyl 2-methylcyclohexanecarboxylate, ethyl 2-methylcyclohexanecarboxylate, 2-propynyl 2-methylcyclohexanecarboxylate, methyl 4-methylcyclohexanecarboxylate, ethyl 4-methylcyclohexanecarboxylate, 2-propynyl 4-methylcyclohexanecarboxylate, methyl 4-fluorocyclohexanecarboxylate, ethyl 4-fluorocyclohexanecarboxylate, 2-propynyl 4-fluorocyclohexanecarboxylate, methyl 4-fluoromethylcyclohexanecarboxylate, ethyl 4-fluoromethylcyclohexanecarboxylate, 2-propynyl 4-fluoromethylcyclohexanecarboxylate, methyl 3-trifluoromethylcyclohexanecarboxylate, ethyl 3-trifluoromethylcyclohexanecarboxylate, 2-propynyl 3-trifluoromethylcyclohexanecarboxylate, methyl 4-trifluoromethylcyclohexanecarboxylate, ethyl 4-trifluoromethylcyclohexanecarboxylate, 2-propynyl 4-trifluoromethylcyclohexanecarboxylate, methyl cycloheptanecarboxylate, ethyl cycloheptanecarboxylate, 2-propynyl cycloheptanecarboxylate, methyl cyclooctanecarboxylate, ethyl cyclooctanecarboxylate and 2-propynyl cyclooctanecarboxylate are preferable, methyl cyclobutanecarboxylate, ethyl cyclobutanecarboxylate, 2-propynyl cyclobutanecarboxylate, methyl cyclopentanecarboxylate, ethyl cyclopentanecarboxylate, 2-propynyl cyclopentanecarboxylate, methyl cyclohexanecarboxylate, ethyl cyclohexanecarboxylate, propyl cyclohexanecarboxylate, butyl cyclohexanecarboxylate, hexyl cyclohexanecarboxylate, 2-propynyl cyclohexanecarboxylate, methyl 2-methylcyclohexanecarboxylate, ethyl 2-methylcyclohexanecarboxylate, 2-propynyl 2-methylcyclohexanecarboxylate, methyl 4-methylcyclohexanecarboxylate, ethyl 4-methylcyclohexanecarboxylate, 2-propynyl 4-methylcyclohexanecarboxylate, methyl cycloheptanecarboxylate, ethyl cycloheptanecarboxylate and 2-propynyl cycloheptanecarboxylate are particularly preferable.

As the specific compound when $R^2$ and $R^3$ do not form a ring in the ester having two alkyl groups at the α-position carbon of the carbonyl group represented by the general formula (I), methyl 2-methylbutyrate, ethyl 2-methylbutyrate, propyl 2-methylbutyrate, butyl 2-methylbutyrate, vinyl 2-methylbutyrate, 2-propenyl 2-methylbutyrate, 2-propynyl 2-methylbutyrate, methyl 2-ethylbutyrate, ethyl 2-ethylbutyrate, propyl 2-ethylbutyrate, butyl 2-ethylbutyrate, 2,2,2-trifluoroethyl 2-ethylbutyrate, vinyl 2-ethylbutyrate, 2-propenyl 2-ethylbutyrate, 2-propynyl 2-ethylbutyrate, methyl 2-ethyl-3-fluorobutyrate, methyl 2-ethyl-4-fluorobutyrate, methyl 2-ethyl-4,4,4-trifluorobutyrate, methyl 2-ethyl-3-methylbutyrate, ethyl 2-ethyl-3-methylbutyrate, vinyl 2-ethyl-3-methylbutyrate, 2-propenyl 2-ethyl-3-methylbutyrate, 2-propynyl 2-ethyl-3-methylbutyrate, methyl 2,3,3-trimethylbutyrate, ethyl 2,3,3-trimethylbutyrate, vinyl 2,3,3-trimethylbutyrate, 2-propenyl 2,3,3-trimethylbutyrate, 2-propynyl 2,3,3-trimethylbutyrate, methyl 2-methylvalerate, ethyl 2-methylvalerate, vinyl 2-methylvalerate, 2-propenyl 2-methylvalerate, 2-propynyl 2-methylvalerate, methyl 2-methyl-3-fluorovalerate, methyl 2-methyl-4-fluorovalerate, methyl 2-methyl-5-fluorovalerate, methyl 2-ethylvalerate, ethyl 2-ethylvalerate, propyl 2-ethylvalerate, butyl 2-ethylvalerate, vinyl 2-ethylvalerate, 2-propenyl 2-ethylvalerate, 2-propynyl 2-ethylvalerate, methyl 2-propylvalerate, ethyl 2-propylvalerate, vinyl 2-propylvalerate, 2-propenyl 2-propylvalerate, 2-propynyl 2-propylvalerate, methyl 3-methyl-2-propylvalerate, ethyl 3-methyl-2-propylvalerate, vinyl 3-methyl-2-propylvalerate, 2-propenyl 3-methyl-2-propylvalerate, 2-propynyl 3-methyl-2-propylvalerate, methyl 4-methyl-2-iso-propylvalerate, ethyl 4-methyl-2-iso-propylvalerate, vinyl 4-methyl-2-iso-propylvalerate, 2-propenyl 4-methyl-2-iso-propylvalerate, 2-propynyl 4-methyl-2-iso-propylvalerate, methyl 2-methylhexanoate, ethyl 2-methylhexanoate, 2,2,2-trifluoroethyl 2-methylhexanoate, vinyl 2-methylhexanoate, 2-propenyl 2-methylhexanoate, 2-propynyl 2-methylhexanoate, methyl 2,6-dimethylhexanoate, ethyl 2,6-dimethylhexanoate, vinyl 2,6-dimethylhexanoate, 2-propenyl 2,6-dimethylhexanoate, 2-propynyl 2,6-dimethylhexanoate, methyl 2-ethylhexanoate, ethyl 2-ethylhexanoate, propyl 2-ethylhexanoate, butyl 2-ethylhexanoate, 2,2,2-trifluoroethyl 2-ethylhexanoate, vinyl 2-ethylhexanoate, 2-propenyl 2-ethylhexanoate, 2-propynyl 2-ethylhexanoate, methyl 2-ethyl-3-fluorohexanoate, methyl 2-ethyl-4-fluorohexanoate, methyl 2-ethyl-5-fluorohexanoate, methyl 2-ethyl-6-fluorohexanoate, methyl 2-propylhexanoate, ethyl 2-propylhexanoate, vinyl 2-propylhexanoate, 2-propenyl 2-propylhexanoate, 2-propynyl 2-propylhexanoate, methyl 2-iso-propylhexanoate, ethyl 2-iso-propylhexanoate, vinyl 2-iso-propylhexanoate, 2-propenyl 2-iso-propylhexanoate, 2-propynyl 2-iso-propylhexanoate, methyl 2-methylheptanoate, ethyl 2-methylheptanoate, 2,2,2-trifluoroethyl 2-methylheptanoate, vinyl 2-methylheptanoate, 2-propenyl 2-methylheptanoate, 2-propynyl 2-methylheptanoate, methyl 2-ethylheptanoate, ethyl 2-ethylheptanoate, propyl 2-ethylheptanoate, butyl 2-ethylheptanoate, 2,2,2-trifluoroethyl 2-ethylheptanoate, vinyl 2-ethylheptanoate, 2-propenyl 2-ethylheptanoate, 2-propynyl 2-ethylheptanoate, methyl 2-methyloctanoate, ethyl 2-methyloctanoate, 2,2,2-trifluoroethyl 2-methyloctanoate, vinyl 2-methyloctanoate, 2-propenyl 2-methyloctanoate, 2-propynyl 2-methyloctanoate, methyl 2-ethyloctanoate, ethyl 2-ethyloctanoate, propyl 2-ethyloctanoate, butyl 2-ethyloctanoate, 2,2,2-trifluoroethyl 2-ethyloctanoate, vinyl 2-ethyloctanoate, 2-propenyl 2-ethyloctanoate, 2-propynyl 2-ethyloctanoate, methyl 2-methyldodecanoate, ethyl 2-methyldodecanoate, vinyl 2-methyldodecanoate, 2-propenyl 2-methyldodecanoate, 2-propynyl 2-methyldodecanoate, methyl 2-ethyldodecanoate, ethyl 2-ethyldodecanoate, vinyl 2-ethyldodecanoate, 2-propenyl 2-ethyldodecanoate, 2-propynyl 2-ethyldodecanoate, methyl di-iso-propylacetate, ethyl di-iso-propylacetate, vinyl di-iso-propylacetate, 2-propenyl di-iso-propylacetate, 2-propynyl di-iso-propylacetate, methyl di-tert-butylacetate, ethyl di-tert-butylacetate, vinyl di-tert-butylacetate, 2-propenyl di-tert-butylacetate and 2-propynyl di-tert-butylacetate may be suitably mentioned.

Among these, methyl 2-ethylbutyrate, ethyl 2-ethylbutyrate, 2-propynyl 2-methylbutyrate, propyl 2-ethylbutyrate, butyl 2-ethylbutyrate, 2,2,2-trifluoroethyl 2-ethylbutyrate, 2-propynyl 2-ethylbutyrate, methyl 2-ethyl-3-fluorobutyrate, methyl 2-ethyl-4-fluorobutyrate, methyl 2-ethyl-4,4,4-trifluorobutyrate, methyl 2-ethyl-3-methylbutyrate, ethyl 2-ethyl-3-methylbutyrate, 2-propynyl 2-ethyl-3-methylbutyrate, methyl 2,3,3-trimethylbutyrate, ethyl 2,3,3-trimethylbutyrate, 2-propynyl 2,3,3-trimethylbutyrate, methyl 2-methylvalerate, ethyl 2-methylvalerate, 2-propynyl 2-methylvalerate, methyl 2-methyl-3-fluorovalerate, methyl 2-methyl-4-fluorovalerate, methyl 2-methyl-5-fluorovalerate, methyl 2-ethylvalerate, ethyl 2-ethylvalerate, propyl 2-ethylvalerate, butyl 2-ethylvalerate, 2-propynyl 2-ethylvalerate, methyl 2-propylvalerate, ethyl 2-propylvalerate, 2-propynyl 2-propylvalerate, methyl 3-methyl-2-propylvalerate, ethyl 3-methyl-2-propylvalerate, 2-propynyl 3-methyl-2-propylvalerate, methyl 4-methyl-2-iso-propylvalerate, ethyl 4-methyl-2-iso-propylvalerate, 2-propynyl 4-methyl-2-iso-propylvalerate, methyl 2-methylhexanoate, ethyl 2-methylhexanoate, 2,2,2-trifluoroethyl 2-methylhexanoate, 2-propynyl 2-methylhexanoate, methyl 2,6-dimethylhexanoate, ethyl 2,6-dimethylhexanoate, 2-propynyl 2,6-dimethylhexanoate, methyl 2-ethylhexanoate, ethyl 2-ethylhexanoate, propyl 2-ethylhexanoate, butyl 2-ethylhexanoate, 2,2,2-trifluoroethyl 2-ethylhexanoate, 2-propynyl 2-ethylhexanoate, methyl 2-ethyl-3-fluorohexanoate, methyl 2-ethyl-4-fluorohexanoate, methyl 2-ethyl-5-fluorohexanoate, methyl 2-ethyl-6-fluorohexanoate, methyl 2-propylhexanoate, ethyl 2-propylhexanoate, 2-propynyl 2-propylhexanoate, methyl 2-iso-propylhexanoate, ethyl 2-iso-propylhexanoate, 2-propynyl 2-iso-propylhexanoate, methyl 2-methylheptanoate, ethyl 2-methylheptanoate, 2,2,2-trifluoroethyl 2-methylheptanoate, 2-propynyl 2-methylheptanoate, methyl 2-ethylheptanoate, ethyl 2-ethylheptanoate, 2,2,2-trifluoroethyl 2-ethylheptanoate, 2-propynyl 2-ethylheptanoate, methyl di-iso-propylacetate, ethyl di-iso-propylacetate and 2-propynyl di-iso-propylacetate are preferable, methyl 2-ethyl-3-methylbutyrate, ethyl 2-ethyl-3-methylbutyrate, 2-propynyl 2-ethyl-3-methylbutyrate, methyl 2-ethylvalerate, ethyl 2-ethylvalerate, propyl 2-ethylvalerate, butyl 2-ethylvalerate, 2-propynyl 2-ethylvalerate, methyl 2-propylvalerate, ethyl 2-propylvalerate, 2-propynyl 2-propylvalerate, methyl 2-ethylhexanoate, ethyl 2-ethylhexanoate, propyl 2-ethylhexanoate, butyl 2-ethylhexanoate, 2-propynyl 2-ethylhexanoate, methyl di-iso-propylacetate, ethyl di-iso-propylacetate and 2-propynyl di-iso-propylacetate are particularly preferable.

Combination with the nonaqueous solvent, the electrolyte salt, and further other additives to be described below allows the nonaqueous electrolytic solution of the present invention to exert synergistically the effects of improving the electrochemical properties in a broad temperature range.

[Nonaqueous Solvent]

As the nonaqueous solvent used in the nonaqueous electrolytic solution of the present invention, cyclic carbonate, chain ester, lactone, ether, amide, phosphoric acid ester, sulfone, nitrile, isocyanate, S=O bond-containing compound etc. may be mentioned, those containing both of cyclic carbonate and chain ester are preferable.

Meanwhile, the term chain ester is used as a concept including chain carbonate and chain carboxylic acid ester.

As the cyclic carbonate, ethylene carbonate (EC), propylene carbonate (PC), 1,2-butylene carbonate, 2,3-butylene carbonate, 4-fluoro-1,3-dioxolane-2-one (FEC), trans- or cis-4,5-difluoro-1,3-dioxolane-2-one (hereinafter, both of them are collectively referred to as "DFEC"), vinylene carbonate (VC), vinylethylene carbonate (VEC) etc. may be mentioned.

Among these, at least one kind of cyclic carbonate having a carbon-carbon double bond or a fluorine atom is preferably used because the load property at low temperature after storage in the charged state at high temperature further improves, and those containing both of cyclic carbonate having a carbon-carbon double bond and cyclic carbonate having a fluorine atom is more preferably used. As the cyclic carbonate having a carbon-carbon double bond, VC and VEC are further preferable, and as the cyclic carbonate having a fluorine atom, FEC and DFEC are further preferable.

The content of the cyclic carbonate having a carbon-carbon double bond is preferably 0.07% by volume or more, more preferably 0.2% by volume or more, and further preferably 0.7% by volume or more, and the upper limit is preferably 7% by volume or less, more preferably 4% by volume or less, and further preferably 2.5% by volume or less with respect to the total volume of the nonaqueous solvent since it can further increase the stability of the coating film at the time of the high temperature cycle without deterioration of Li ion permeability at low temperature, so it is preferable.

The content of the cyclic carbonate having a fluorine atom is preferably 0.07% by volume or more, more preferably 4% by volume or more, and further preferably 7% by volume or more, and the upper limit is preferably 35% by volume or less, more preferably 25% by volume or less, and further preferably 15% by volume or less with respect to the total volume of the nonaqueous solvent since it can further increase the stability of the coating film at the time of the high temperature cycle without deterioration of Li ion permeability at low temperature, so it is preferable.

When the nonaqueous solvent contains both of the cyclic carbonate having a carbon-carbon double bond and the cyclic carbonate having a fluorine atom, the content of the cyclic carbonate having a carbon-carbon double bond with respect to the content of the cyclic carbonate having a fluorine atom, is preferably 0.2% by volume or more, more preferably 3% by volume or more, and further preferably 7% by volume or more, and the upper limit is preferably 40% by volume or less, more preferably 30% by volume or less, and further preferably 15% by volume or less since it can furthermore increase the stability of the coating film at the time of the high temperature cycle without deterioration of Li ion permeability at low temperature, so it is particularly preferable.

In addition, the nonaqueous solvent preferably contains ethylene carbonate and/or propylene carbonate since it reduces the resistance of the coating film formed on the electrode. The content of ethylene carbonate and/or propylene carbonate is preferably 3% by volume or more, more preferably 5% by volume or more, and further preferably 7% by volume or more, and the upper limit is preferably 45% by volume or less, more preferably 35% by volume or less, and further preferably 25% by volume or less with respect to the total volume of the nonaqueous solvent.

These solvents may be used in one kind. In addition, these solvents are preferably used in two or more kinds, and particularly preferably three or more kinds in combination since the electrochemical properties in a broad temperature range are further improved. A suitable combination of these cyclic carbonates is preferably EC and PC, EC and VC, PC and VC, VC and FEC, EC and FEC, PC and FEC, FEC and DFEC, EC and DFEC, PC and DFEC, VC and DFEC, VEC and DFEC, EC, PC and VC, EC, PC and FEC, EC, VC and FEC, EC, VC and VEC, PC, VC and FEC, EC, VC and DFEC, PC, VC and DFEC, EC, PC, VC and FEC, EC, PC, VC and DFEC, etc. Among the combinations, the more preferably combinations are a combination of EC and VC, EC and FEC, PC and FEC, EC, PC and VC, EC, PC and FEC, EC, VC and FEC, PC, VC and FEC, EC, PC, VC and FEC, etc.

As the chain ester, one containing an ester represented by the following general formula (II) is preferable.

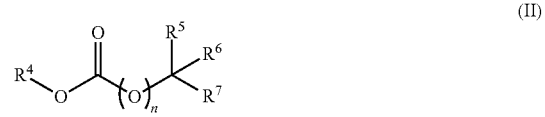

(II)

(wherein, $R^4$ is a $C_1$ to $C_3$ alkyl group, a $C_2$ to $C_6$ alkenyl group or a $C_2$ to $C_6$ alkynyl group in which at least one of the hydrogen atoms may be substituted with a halogen atom, $R^5$ to $R^7$ are each independently a hydrogen atom, or a $C_1$ to $C_3$ alkyl group in which at least one of the a hydrogen atoms may be substituted with a halogen atom. "n" represents an integer of 0 or 1. However, the ester represented by the general formula (I) is excluded.)

As the ester represented by the general formula (II), specifically asymmetrically chain carbonates such as methylethyl carbonate (MEC), methylpropyl carbonate (MPC), methylisopropyl carbonate (MIPC), methylbutyl carbonate and ethylpropyl carbonate, symmetrically chain carbonates such as dimethyl carbonate (DMC), diethyl carbonate (DEC), dipropyl carbonate and dibutyl carbonate, or chain carboxylic acid esters such as methyl acetate, ethyl acetate, methyl propionate, ethyl propionate, methyl pivalate, ethyl pivalate and propyl pivalate may be suitably mentioned. Among these, a pivalic acid ester which is a tertiary carboxylic acid ester is preferable from the viewpoint of improvement of the electrochemical properties in a broad temperature range, methyl pivalate is particularly preferable.

The content of the ester represented by the general formula (II) is not particularly limited, but is preferably used in a range of 1 to 80% by volume with respect to the total volume of the nonaqueous solvent. If the content is 1% by volume or more, the effects of improving the electrochemical properties in a broad temperature range increase, so it is preferable. If the content is 80% by volume or less, the fear of the decline in the electrochemical properties in a broad temperature range due to the decline of the electrical conductivity of the nonaqueous electrolytic solution is small, so it is preferable. The content is preferably 30% by volume or more, and the upper limit thereof is preferably 70% by volume or less.

In addition, when the pivalic acid ester is used, it is preferably used in combination with the chain carbonate, and it is further preferable that the content of the pivalic acid ester is larger than that of the chain carbonate.

The volume ratio taken up by the pivalic acid ester in the ester represented by the general formula (II) is preferably 51% by volume or more, and more preferably 55% by volume or more. The upper limit is more preferably 95% by volume or less, and further preferably 85% by volume or less.

In addition, the chain carbonate particularly preferably contains dimethyl carbonate or diethyl carbonate.

In the above-mentioned case, the electrochemical properties improves in a further broader temperature range, so it is preferable.

The ratio of the cyclic carbonate and the chain ester is preferably 10:90 to 45:55, more preferably 15:85 to 40:60, and particularly preferably 20:80 to 35:65 as cyclic carbonate:chain ester (volume ratio) from the viewpoint of improvement of the electrochemical properties in a broad temperature range.

As the other nonaqueous solvent, dimethyl oxalate, ethylmethyl oxalate, diethyl oxalate etc. may be mentioned. As the lactone, γ-butyro lactone, γ-valero lactone, and α-angelica lactone etc. may be mentioned. As the ether, cyclic ethers such as tetrahydrofuran, 2-methyltetrahydrofuran, 1,3-dioxolane, 1,3-dioxane and 1,4-dioxane, chain ethers such as 1,2-dimethoxyethane, 1,2-diethoxyethane and 1,2-dibutoxyethane etc. may be mentioned.

As the amide, dimethyl formamide etc. may be mentioned. As the phosphoric acid ester, trimethyl phosphate, tributyl phosphate, and trioctyl phosphate etc. may be mentioned. As the sulfone, sulfolane etc. may be mentioned. As the nitrile, acetonitrile, propionitrile, succinonitrile, glutaronitrile, adiponitrile, and pimelonitrile etc. may be mentioned. As the isocyanate, tetramethylene diisocyanate, hexamethylene diisocyanate, octamethylene diisocyanate etc. may be mentioned. As the S=O bond-containing compound, S=O bond-containing compounds selected from sultone compounds such as 1,3-propanesultone, 1,3-butane sultone and 1,4-butane sultone, cyclic sulfite compounds such as ethylene sulfite, hexahydrobenzo[1,3,2]dioxathiolane-2-oxide (also referred to as 1,2-cyclohexanediol cyclic sulfite) and 5-vinyl-hexahydro-1,3,2-benzodidioxathiol-2-oxide, sulfonic acid ester compounds such as 2-propynyl methane sulfonate and methylene methane disulfonate, and, vinyl sulfone compounds such as divinyl sulfone, 1,2-bis(vinylsulfonyl)ethane and bis(2-vinylsulfonylethyl)ether etc., chain carboxylic acid anhydrides such as acetic anhydride and propionic anhydride, cyclic acid anhydrides such as succinic anhydride, maleic anhydride, glutaric anhydride, itaconic anhydride and 3-sulfo-propionic anhydride, cyclic phosphazene compounds such as methoxypentafluoro cyclotriphosphazene, ethoxypentafluoro cyclotriphosphazene, phenoxypentafluoro cyclotriphosphazene and ethoxyheptafluoro cyclotetraphosphazene, aromatic compounds having a branched alkyl group such as cyclohexyl benzene, fluorocyclohexyl benzene compounds (1-fluoro-2-cyclohexyl benzene, 1-fluoro-3-cyclohexyl benzene, 1-fluoro-4-cyclohexyl benzene), tert-butyl benzene, tert-amyl benzene and 1-fluoro-4-tert-butyl benzene, and aromatic compounds such as biphenyl, terphenyl (o-, m-, p-form), diphenyl ether, fluorobenzene, difluorobenzene (o-, m-, p-form), anisole, 2,4-difluoroanisole, and a partial hydride of terphenyl (1,2-dicyclohexyl benzene, 2-phenyl bicyclohexyl, 1,2-diphenyl cyclohexane, o-cyclohexylbiphenyl) may be suitably mentioned.

The above-mentioned nonaqueous solvent is ordinarily used in a mixture in order to accomplish appropriate physical properties. As the combination thereof, for example, a combination of cyclic carbonate and chain carbonate, a combination of cyclic carbonate and chain carboxylic acid ester, a combination of cyclic carbonate, chain carbonate and lactone, a combination of cyclic carbonate, chain carbonate and ether, a combination of cyclic carbonate, chaine carbonate and chain carboxylic acid ester etc. may be suitably mentioned.

[Electrolyte Salt]

As the electrolyte salt used in the present invention, the lithium salts and the onium salts to be described below may be suitably mentioned.

(Lithium Salt)

As the lithium salt, inorganic lithium salts such as $LiPF_6$, $LiPO_2F_2$, $Li_2PO_3F$, $LiBF_4$ and $LiClO_4$, lithium salts containing a chain fluoroalkyl group such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$ and $LiPF_5(iso-C_3F_7)$, lithium salts having a cyclic fluoroalkylene chain such as $(CF_2)_2(SO_2)_2NLi$ and $(CF_2)_3(SO_2)_2Nli$, and lithium salts having an oxalate complex as anion such as lithium bis[oxalate-O,O'] borate and lithium difluoro[oxalate-O,O'] borate may be suitably mentioned. These may be used in one kind or in a mixture of two or more kinds. Among these, at least one kind selected from $LiPF_6$, $LiPO_2F_2$, $Li_2PO_3F$, $LiBF_4$, $LiN(SO_2CF_3)_2$ and $LiN(SO_2C_2F_5)_2$ is preferable, and at least one kind selected from $LiPF_6$, $Li_2PO_3F$, $LiBF_4$ and $LiN(SO_2CF_3)_2$ is further preferable. The concentration of the lithium salt is ordinarily preferably 0.3 M or more, more preferably 0.7 M or more, and further preferably 1.1 M or more with respect to the nonaqueous solvent. In addition, the upper limit thereof is preferably 2.5 M or less, more preferably 2.0 M or less, and further preferably 1.6 M or less.

In addition, a suitable combination of these lithium salts preferably contains $LiPF_6$ and further at least one kind of a lithium salt selected from $LiPO_2F_2$, $LiBF_4$ and $LiN(SO_2CF_3)_2$ in the nonaqueous electrolytic solution. The ratio taken up by the lithium salts other than $LiPF_6$ is preferably 0.001 M or more in the nonaqueous solvent due to easy exertion of the effects of improving the electrochemical properties at high temperature, and is preferably 0.005 M or less because the fear of the decline in the effects of improving the electrochemical properties at high temperature is small. The ratio is preferably 0.01 M or more, particularly preferably 0.03 M or more, and most preferably 0.04 M or more. The upper limit thereof is preferably 0.4 M or less, and particularly preferably 0.2 M or less.

(Onium Salt)

Also, as the onium salt, various salts from combination of the onium cation and the anion described below may be suitably mentioned.

As specific examples of the onium cation, tetramethyl ammonium cation, ethyltrimethyl ammonium cation, diethyldimethyl ammonium cation, triethylmethyl ammonium cation, tetraethyl ammonium cation, N,N-dimethyl pyrrolidinium cation, N-ethyl-N-methylpyrrolidinium cation, N,N-diethyl pyrrolidinium cation, spiro-(N,N')-bipyrrolidinium cation, N,N'-dimethyl imidazolinium cation, N-ethyl-N'-methyl imidazolinium cation, N,N'-diethyl imidazolinium cation, N,N'-dimethyl imidazolinium cation, N-ethyl-N'-methyl imidazolinium cation, N,N'-diethyl imidazolinium cation, etc. may be suitably mentioned.

As specific examples of the anion, $PF_6$ anion, $BF_4$ anion, $ClO_4$ anion, $AsF_5$ anion, $CF_3SO_3$ anion, $N(CF_3SO_2)_2$ anion, $N(C_2F_5SO_2)_2$ anion, etc. may be suitably mentioned.

These electrolyte salts may be used alone in one kind or may be used in combination of two or more kinds.

[Preparation of the Nonaqueous Electrolytic Solution]

The nonaqueous electrolytic solution of the present invention may be obtained by, for example, mixing the above nonaqueous solvents, and adding to this the ester having two alkyl groups at the α-position carbon of the carbonyl group represented by the general formula (I), with respect to the electrolyte salts and the nonaqueous electrolytic solution.

At this time, as the compound added to the nonaqueous solvent and the nonaqueous electrolytic solution that is used, the compound having small impurities as possible by being purified in adovance is preferably used within a range where the productivity does not prominently decline.

The nonaqueous electrolytic solution of the present invention may be used in the first to the fourth energy storage devices described below. As the nonaqueous electrolyte, not only liquid one, but also gellated one may be used. Furthermore, the nonaqueous electrolytic solution of the present invention may be also used for a solid polymer electrolyte. Among these, the nonaqueous electrolytic solution of the present invention is preferably used for the first energy storage device (namely, for a lithium battery) or for the fourth energy storage device (namely, for a lithium ion capacitor) in which a lithium salt is used as the electrolyte salts, and more preferably used for a lithium battery, and most suitably used for the lithium secondary battery.

[First Energy Storage Device (Lithium Battery)]

The lithium battery of the present invention is a general term for a lithium primary battery and a lithium secondary battery. Further, in the present description, the term of the lithium secondary battery is used as a concept also including the so-called lithium ion secondary battery. The lithium battery of the present invention comprises a positive electrode, a negative electrode and the nonaqueous electrolytic solution in which an electrolyte salt is dissolved in a nonaqueous solvent. The constituent members such as the positive electrode and the negative electrode etc. besides the nonaqueous electrolytic solution may be used without particular limitation.

For example, as the positive electrode-active material for a lithium secondary battery, a complex metal oxide with lithium, which contains one or more kinds selected from cobalt, manganese and nickel, is used. These positive electrode-active materials may be used alone in one kind or in combination of two or more kinds.

As the lithium complex metal oxide, for example, $LiCoO_2$, $LiMn_2O_4$, $LiNiO_2$, $LiCo_{1-x}Ni_xO_2$ ($0.01<x<1$), $LiCo_{1/3}Ni_{1/3}Mn_{1/3}O_2$, $LiNi_{1/2}Mn_{3/2}O_4$, $LiCo_{0.98}Mg_{0.02}O_2$, etc. may be mentioned. Further, it may be used in combination such as $LiCoO_2$ and $LiMn_2O_4$, $LiCoO_2$ and $LiNiO_2$, $LiMn_2O_4$ and $LiNiO_2$.

In addition, a portion of the lithium complex metal oxide may be substituted with another element in order to improve the safety at the time of the overcharge, or the cycle property, and allow the usage at 4.3 V or more of the charge potential based on Li. For example, a portion of cobalt, manganese or nickel may be substituted with at least one or more kinds of elements such as Sn, Mg, Fe, Ti, Al, Zr, Cr, V, Ga, Zn, Cu, Bi, Mo and La, or a portion of O may be substituted with S or F, or the lithium complex metal oxide may be coated with a compound that contains these other elements.

Among these, a lithium complex metal oxide that allows the usage at 4.3 V or more of the charge potential of the positive electrode based on Li in the full-charge state, such as $LiCoO_2$, $LiMn_2O_4$ and $LiNiO_2$, is preferable, a lithium complex metal oxide that allows the usage at 4.4 V or more based on Li such as a solid solution with $LiCo_{1-x}M_xO_2$ (wherein, M is at least one or more kinds of elements selected from Sn, Mg, Fe, Ti, Al, Zr, Cr, V, Ga, Zn and Cu, $0.001 \leq x \leq 0.05$), $LiCo_{1/3}Ni_{1/3}Mn_{1/3}O_2$, $LiNi_{1/2}Mn_{3/2}O_4$, and $Li_2MnO_3$ and $LiMO_2$ (M is a transitional metal such as Co, Ni, Mn and Fe) is more preferable. When a lithium complex metal oxide operating at high charge voltage is used, particularly the electrochemical properties in a broad temperature range easily decline due to the reaction with an electrolytic solution at the time of the charge. However, the lithium secondary battery related to the present invention can suppress the decline of these electrochemical properties.

Particularly, when a positive electrode containing Mn is used, the resistance of a battery tends to easily increase due to elution of Mn ion from the positive electrode, and thus the electrochemical properties in a broad temperature range tend to easily decline. However, the lithium secondary battery related to the present invention can suppress the decline of these electrochemical properties, and thus is preferable.

Furthermore, as the positive electrode-active material, lithium-containing olivine-type phosphoric acid salt may be also used. Particularly, lithium-containing olivine-type phosphoric acid salt containing at least one or more kinds selected from iron, cobalt, nickel and manganese is preferable. As specific examples thereof, $LiFePO_4$, $LiCoPO_4$, $LiNiPO_4$, $LiMnPO_4$, etc. may be mentioned.

A portion of these lithium-containing olivine-type phosphoric acid salts may be substituted with another element. A portion of iron, cobalt, nickel or manganese may be substituted with one or more kinds of an element selected from Co, Mn, Ni, Mg, Al, B, Ti, V, Nb, Cu, Zn, Mo, Ca, Sr, W and Zr, etc. or the lithium-containing olivine-type phosphoric acid salt may be coated with a compound containing these other elements or a carbon material. Among these, $LiFePO_4$ or $LiMnPO_4$ is preferable.

Further, the lithium-containing olivine-type phosphoric acid salt may be used in a mixture with, for example, the above positive electrode-active material.

In addition, As the positive electrode for a lithium primary battery, one kind, or two or more kinds of metal elements or chalcogen compounds such as $CuO$, $Cu_2O$, $Ag_2O$, $Ag_2CrO_4$, $CuS$, $CuSO_4$, $TiO_2$, $TiS_2$, $SiO_2$, $SnO$, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, $FeO$, $Fe_3O_4$, $Ni_2O_3$, $NiO$, $CoO_3$ and CoO, sulfur compounds such as $SO_2$ and $SOCl_2$, fluorocarbon (fluorographite) represented by general formula $(CF_x)_n$, etc. may be mentioned. Among these, $MnO_2$, $V_2O_5$, fluorographite etc. are preferable.

The pH of the supernatant solution when 10 g of the above-mentioned positive electrode-active material is dispersed in 100 ml distilled water, is preferably 10.0 to 12.5, and more preferably 10.5 to 12.0 since the effects of improving the electrochemical properties in a further broader temperature range are obtained easily.

Further, the positive electrode preferably contains Ni as an element since impurities such as LiOH in the positive electrode-active material tends to increase, and thus the effects of improving the electrochemical properties in a further broader temperature range are obtained easily. The atomic concentration of Ni in the positive electrode-active material is more preferably 5 to 25 atomic %, and particularly preferably 8 to 21 atomic %.

The conductive material of the positive electrode is not particularly limited as long as an electron conduction material that does not cause chemical change to the electrolytic solution. For example, graphites such as natural graphite (flattened graphite etc.) and artificial graphite, carbon black such as acethylene black, Ketjen black, channel black, furnace black, lamp black and thermal black, etc. may be mentioned. In addition, the graphite and the carbon black may be suitably mixed and used. The addition amount of the conductive material to the positive electrode mixture is preferably 1 to 10% by mass, and particularly preferably 2 to 5% by mass.

The positive electrode can be manufactured by mixing the above-mentioned positive electrode-active material with the conductive material such as acethylene black and carbon black, and a binder such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), and ethylene-propylene-diene terpolymer, and adding a high boiling-point solvent such as 1-methyl-2-pyrrolidone to this, and kneading them to prepare the positive electrode mixture, and then applying this positive electrode mixture to a current collector such as aluminum foil and lath plate made of stainless-steel, drying, pressure molding, and then subjecting the resultant to heat treatment at a temperature of 50° C. to 250° C. or so for 2 hours or so under vacuum.

The density of parts excluding the current collector of the positive electrode is ordinarily 1.5 g/cm$^3$ or more, preferably 2 g/cm$^3$ or more, more preferably 3 g/cm$^3$ or more, and further preferably 3.6 g/cm$^3$ or more in order to further enhance the capacity of the battery. Meanwhile, the upper limit is preferably 4 g/cm$^3$ or less.

As the negative electrode-active material for a lithium secondary battery, lithium metal or lithium alloy, and a carbon material which can absorb and release lithium [graphitizable carbon, non-graphitizable carbon having 0.37 nm or more of the spacing of the (002) plane, graphite having 0.34 nm or less of the spacing of the (002) plane, etc.], tin (simple substance), a tin compound, silicon (simple substance), a silicon compound, and a lithium titanate compound such as $Li_4Ti_5O_{12}$ etc. may be used alone in one kind or in combination of two or more kinds.

Among these, a high crystalline carbon material such as artificial graphite and natural graphite is preferable, and a carbon material having a graphite-type crystalline structure having 0.340 nm (nanometer) or less, particularly 0.335 to 0.337 nm of the spacing ($d_{002}$) of the lattice plane (002) is particularly preferable from the view of absorption and release ability of the lithium ion.

A ratio (I(110)/I(004)) of a peak intensity I(110) of a (110) plane and a peak intensity I (004) of a (004) plane in the graphite crystal which are obtained from X ray diffractiometry of the negative electrode sheet subjected to pressure molding so that a density of parts excluding the current collector of the negative electrode is 1.5 g/cm$^3$ or more is controlled to 0.01 or more by using artificial graphite particles having a bulky structure in which plural flattened graphite fine particles are put together or combined non-parallel to each other, or graphite particles obtained by exerting repeatedly a mechanical action, such as a compressive force, a friction force, a shearing force, etc. on flaky natural graphite particles to subject them to spheroidizing treatment, whereby the electrochemical characteristics in a further broader temperature range are improved, and therefore it is preferred. The ratio is more preferably 0.05 or more, further preferably 0.1 or more. Further, the negative electrode sheet is treated too much in a certain case and reduced in a crystallinity to reduce a discharge capacity of the battery, and therefore an upper limit thereof is preferably 0.5 or less, more preferably 0.3 or less.

Further, the high crystalline carbon material (core material) is preferably coated with a carbon material having lower crystallinity than that of the core material since the electrochemical properties in a broad temperature range becomes further better. The crystallinity of the coated carbon material can be confirmed by TEM.

When a high crystalline carbon material is used, the high crystalline carbon material reacts with a nonaqueous electrolytic solution at the time of the charge, and the electrochemical properties in a broad temperature range tends to decline due to increase of the interface resistance. However, with the lithium secondary battery related to the present invention, the electrochemical properties in a broad temperature range becomes better.

Further, as the metal compound which can absorb and release lithium as the negative electrode-active material, compounds containing at least one kind of a metal element such as Si, Ge, Sn, Pb, P, Sb, Bi, Al, Ga, In, Ti, Mn, Fe, Co, Ni, Cu, Zn, Ag, Mg, Sr and Ba may be mentioned. These metal compounds may be used in any form such as an element, an alloy, an oxide, a nitride, a sulfide, a boride, an alloy with lithium. However, the metal compound is preferably any one of an element, an alloy, an oxide and an alloy with lithium since it allows the battery to have high capacity. Among these, those containing at least one kind of an element selected from Si, Ge and Sn are preferable, those containing at least one kind of an element selected from Si and Sn are more preferable since it allows the battery to have high capacity.

The negative electrode can be manufactured in a similar manner to the manufacture of the above-mentioned positive electrode by using and kneading the conductive material, the bindert and the high boiling point solvent to prepare a negative electrode mixture, and then applying this negative electrode mixture to a current collector such as copper foil, drying, pressure molding, and then subjecting the resultant to heat treatment at a temperature of 50° C. to 250° C. or so for 2 hours or so under vacuum.

The density of parts excluding the current collector of the negative electrode is ordinarily 1.1 g/cm$^3$ or more, preferably 1.5 g/cm$^3$ or more, and particularly preferably 1.7 g/cm$^3$ or more in order to further enhance the battery capacity. Meanwhile, the upper limit is preferably 2 g/cm$^3$ or less.

Further, as the negative electrode-active material for the lithium primary battery, lithium metal or lithium alloy may be mentioned.

The structure of the lithium battery is not particularly limited, and a coin-type battery, a cylinder-type battery, an square-shaped battery, a laminate-type battery etc. having a unilamellar or laminated separator may be applied.

The separator for the battery is not particularly limited, but a unilamellar or laminated microporous film of a polyolefin such as polypropylene and polyethylene, woven fabric cloth, nonwoven fabric cloth, etc. may be used.

The lithium secondary battery of the present invention is excellent in the electrochemical properties in a broad temperature range even when the charge termination voltage is 4.2 V or more, particularly 4.3 V or more, and further the properties are good even when the charge termination voltage is 4.4 V or more. The discharge cut-off voltage is ordinarily 2.8 V or more, and further can be rendered to be 2.5 V or more. However, the discharge cut-off voltage can be rendered to be 2.0 V or more with the lithium secondary battery of the present invention. The current value is not particularly limited, but is ordinarily used in a range of 0.1 to 30 C. Further, the lithium battery of the present invention can be charged and discharged at −40 to 100° C., preferably −10 to 80° C.

In the present invention, as a countermeasure for increase of the inner pressure of the lithium battery, a method of establishing a safety valve at the cover of the battery, or a method of making incision on a member such as the battery can or the gasket may be also adopted. Further, as a countermeasure for the safety to prevent the overcharge, current shutoff mechanism that shutoffs the current upon perception of the inner pressure of the battery may be established on the cover of the battery.

[Second Energy Storage Device (Electric Double Layer Capacitor)]

The second energy storage device of the present invention is an energy storage device that stores the energy using the capacity of the electric double layer at the interface of the electrolytic solution and the electrode. One example of the present invention is an electric double layer capacitor. The most typical electrode-active material used in this energy storage device is activated carbon. The capacity of the double layer increases generally in proportion to the surface area.

[Third Energy Storage Device]

The third energy storage device of the present invention is an energy storage device that stores the energy using the doping/de-doping reaction of the electrode. As the electrode-active material used in this energy storage device, metal oxides such as ruthenium oxide, iridium oxide, tungsten oxide, molybdenum oxide and copper oxide, and π conjugated polymers such as polyacene and a polythiophene derivative may be mentioned. A capacitor using these electrode-active materials allows storage of the energy accompanied with the doping/de-doping reaction of the electrode.

[Fourth Energy Storage Device (Lithium Ion Capacitor)]

The fourth energy storage device of the present invention is an energy storage device that stores the energy using intercalation of lithium ion into a carbon material such as graphite that is the negative electrode. The energy storage device is called the lithium ion capacitor (LIC). As the positive electrode, for example, those using an electric double layer between the activated carbon electrode and the electrolytic solution, those using the doping/de-doping reaction of π conjugated polymer electrode, etc. may be mentioned In the electrolytic solution, at least lithium salt such as $LiPF_6$ is contained.

EXAMPLES

Hereinafter, Examples of the electrolytic solution of the present invention will be described. However, the present invention is not limited to these Examples.

Examples 1 to 10 and Comparative Examples 1 and 2

Manufacture of Lithium Ion Secondary Cell

94% by mass of $LiNi_{1/3}Mn_{1/3}Co_{1/3}O_2$ (positive electrode-active material: the pH of the supernatant solution at the time when 10 g of a positive electrode-active material was dispersed in 100 ml distilled water was 10.8) and 3% by mass of acethylene black (conductive material) was mixed, and added to a solution in which 3% by mass of polyvinylidene fluoride (binder) was dissolved in 1-methyl-2-pyrrolidone in advance, and mixed, to prepare a paste of the positive electrode mixture. This paste of the positive electrode mixture was applied onto one face of an aluminum foil (current collector), dried, pressure treated and punched to a desired size, to manufacture a positive electrode sheet. The density of parts excluding the current collector of the positive electrode was 3.6 g/cm$^3$. In addition, 95% by mass of artificial graphite coated with amorphous carbon (negative electrode-active material, $d_{002}$=0.335 nm) was added to a solution in which 5% by mass of polyvinylidene fluoride (binder) was dissolved in 1-methyl-2-pyrrolidone in advance, and mixed, to prepare a paste of the negative electrode mixture. This paste of the negative electrode mixture was applied onto one face of a copper foil (current collector), dried, pressure treated and punched to a desired size, to manufacture a negative electrode sheet. The density of parts excluding the current collector of the negative electrode was 1.5 g/cm$^3$. In addition, X ray diffraction was measured using this electrode sheet. As a result, the ratio [I(110)/I(004)] of the peak intensity I(110) of the graphite crystalline (110) plane and the peak intensity I(004) of the graphite crystalline (004) plane was 0.1. Then, the positive electrode sheet, a separator made of a microporous polyethylene film, and the negative electrode sheet were laminated in this order, and the nonaqueous electrolytic solution of the composition described in Tables 1 and 2 was added, to manufacture a 2032-type coin-type cell.

[Evaluation of Low Temperature Cycle Properties]

Using the coin-type cell manufactured with the above-mentioned method, in 25° C. constant-temperature bath, the coin-type cell was charged to 4.2 V (charge termination voltage) at 1 C constant current, and then charged at 4.2 V constant voltage for 2.5 hours, and then discharged to 3.0 V discharge voltage (discharge cut-off voltage) at 1 C constant current. Then, in 0° C. constant-temperature bath, the coin-type cell was charged to 4.2 V at 1 C constant current, and then charged at 4.2 V constant voltage for 2.5 hours, and then discharged to 3.0 V discharge voltage at 1 C constant current. This was repeated to 50 cycles. Then, the discharge capacity retention (%) after the 50 cycles at 0° C. was obtained from the equation below. The results are listed in Table 1.

Discharge capacity retention (%) after 50 cycles at 0° C.=(Discharge capacity of 50th cycle at 0° C./Discharge capacity of 1st cycle at 0° C.)×100

[Evaluation of High Temperature Cycle Properties]

Using the cell manufactured with the above-mentioned method, in 60° C. constant-temperature bath, the cell was charged to 4.2 V (charge termination voltage) at 1 C constant current, and then charged at 4.2 V constant voltage for 2.5 hours, and then discharged to 3.0 V discharge voltage (discharge cut-off voltage) at 1 C constant current. This was repeated to 100 cycles. Then, the discharge capacity retention (%) after 100 cycles at 60° C. was obtained from the equation below. The results are listed in Tables 1 and 2.

Discharge capacity retention (%) after 100 cycles at 60° C.=(Discharge capacity of 100th cycle at 60° C./Discharge capacity of 1st cycle at 60° C.)×100

The conditions for the manufacture of the cell and the properties of the cell are listed in Tables 1 and 2.

TABLE 1

| | Composition of electrolyte salt Composition of nonaqueous electrolytic solution (Volume ratio of solvent) | Ester of General formula (I) | Discharge capacity retention (%) after 0° C. cycle | Discharge capacity retention (%) after 60° C. cycle |
|---|---|---|---|---|
| Example 1 | 1.2 M LiPF6 EC/VC/DEC/Ester of General formula (I) (28/2/69.5/0.5) | cyclohexanecarboxylic acid methyl ester | 66 | 72 |
| Example 2 | 1.2 M LiPF6 EC/VC/DEC/Ester of General formula (I) (28/2/65/5) | cyclohexanecarboxylic acid methyl ester | 73 | 76 |
| Example 3 | 1.2 M LiPF6 EC/VC/DEC/Ester of General formula (I) (28/2/60/10) | cyclohexanecarboxylic acid methyl ester | 72 | 73 |
| Example 4 | 1.2 M LiPF6 EC/VC/DEC/Ester of General formula (I) (28/2/40/30) | cyclohexanecarboxylic acid methyl ester | 69 | 71 |
| Example 5 | 1.2 M LiPF6 EC/VC/DEC/Ester of General formula (I) (28/2/65/5) | cyclopropanecarboxylic acid methyl ester | 70 | 73 |
| Example 6 | 1.2 M LiPF6 EC/VC/DEC/Ester of General formula (I) (28/2/65/5) | cyclohexanecarboxylic acid propargyl ester | 70 | 72 |
| Comparative Example 1 | 1.2 M LiPF6 EC/VC/DEC (28/2/70) | None | 59 | 63 |
| Comparative Example 2 | 1.2 M LiPF6 EC/VC/DEC/Methyl isobutyrate (28/2/65/5) | None | 62 | 65 |

TABLE 2

| | Composition of electrolyte salt Composition of nonaqueous electrolytic solution (Volume ratio of solvent) | Ester of General formula (I) | Discharge capacity retention (%) after 0° C. cycle | Discharge capacity retention (%) after 60° C. cycle |
|---|---|---|---|---|
| Example 7 | 1.2 M LiPF6 EC/VC/DEC/Ester of General formula (I) (28/2/65/5) | 2-ethylhexanoic acid methyl ester | 72 | 75 |

TABLE 2-continued

| | Composition of electrolyte salt Composition of nonaqueous electrolytic solution (Volume ratio of solvent) | Ester of General formula (I) | Discharge capacity retention (%) after 0° C. cycle | Discharge capacity retention (%) after 60° C. cycle |
|---|---|---|---|---|
| Example 8 | 1.2 M LiPF6 + 0.05 M LiBF4 EC/VC/Methyl pivalate/Ester of General formula (I) (28/2/65/5) | 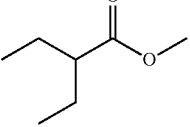 | 73 | 77 |
| Example 9 | 1.2 M LiPF6 + 0.05 M LiBF4 EC/PC/VC/DEC/Methyl pivalate/Ester of General formula (I) (10/18/5/2/15/40/5) | 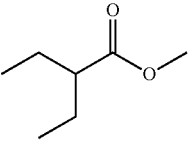 | 78 | 80 |
| Example 10 | 1.2 M LiPF6 + 0.05 M LiBF4 EC/PC/VC/DEC/Methyl pivalate/Ester of General formula (I) (10/18/5/2/15/40/5) | 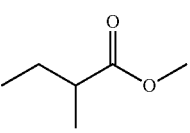 | 75 | 78 |
| Comparative Example 2 | 1.2 M LiPF6 EC/VC/DEC/Methyl isobutyrate (28/2/65/5) | None | 62 | 65 |

Example 11 and Comparative Example 3

Silicon (simple substance) (negative electrode-active material) was used instead of the negative electrode-active materials used in Example 2 and Comparative Example 1, to manufacture the negative electrode sheet. 80% by mass of silicon (simple substance) and 15% by mass of acetylene black (conductive material) were mixed, and added to a solution in which 5% by mass of polyvinylidene fluoride (binder) was dissolved in 1-methyl-2-pyrrolidone in advance, and mixed, to prepare a paste of the negative electrode mixture. This paste of the negative electrode mixture was applied onto a copper foil (current collector), dried, pressure treated, and punched to a desired size, to manufacture a negative electrode sheet. Other steps were performed similarly to Example 2 and Comparative Example 1 to manufacture a coin-type cell, and evaluations for the cell were performed. The results are listed in Table 3.

Example 12 and Comparative Example 4

LiFePO4 (positive electrode-active material) coated with amorphous carbon was used instead of the positive electrode-active materials used in Example 2 and Comparative Example 1, to manufacture a positive electrode sheet. 90% by mass of LiFePO4 coated with amorphous carbon and 5% by mass of acethylene black (conductive material) were mixed, and added to a solution in which 5% by mass of polyvinylidene fluoride (binder) was dissolved in 1-methyl-2-pyrrolidone in advance, and mixed, to prepare a paste of the positive electrode mixture. This paste of the positive electrode mixture was applied onto one face of an aluminum foil (current collector), dried, pressure treated, and punched to a desired size, to manufacture a positive electrode sheet. The charge termination voltage was 3.6 V and the discharge cut-off voltage was 2.0 V in the battery evaluations. Other steps were performed similarly to Example 2 and Comparative Example 1

TABLE 3

| | Composition of electrolyte salt Composition of nonaqueous electrolytic solution (Volume ratio of solvent) | Ester of General formula (I) | Discharge capacity retention (%) after 0° C. cycle | Discharge capacity retention (%) after 60° C. cycle |
|---|---|---|---|---|
| Example 11 | 1.2 M LiPF6 EC/VC/DEC/Ester of General formula (I) (28/2/65/5) | 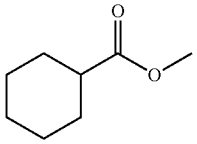 | 72 | 62 |
| Comparative Example 3 | EC/VC/DEC (28/2/70) | None | 61 | 35 |

TABLE 4

| | Composition of electrolyte salt Composition of nonaqueous electrolytic solution (Volume ratio of solvent) | Ester of General formula (I) | Discharge capacity retention (%) after 0° C. cycle | Discharge capacity retention (%) after 60° C. cycle |
|---|---|---|---|---|
| Example 12 | 1.2 M LiPF6 EC/VC/DEC/Ester of General formula (I) (28/2/65/5) | (cyclohexanecarboxylic acid methyl ester structure) | 82 | 80 |
| Comparative Example 4 | 1.2 M LiPF6 EC/VC/DEC (28/2/70) | None | 63 | 66 |

Any of the lithium secondary cells of Examples 1 to 10 described above prominently improves the electrochemical properties in a broad temperature range in comparison to the lithium secondary cell of Comparative Example 1 that does not contain the ester having two alkyl groups at the α-position carbon of the carbonyl group represented by the general formula (I) in the nonaqueous electrolytic solution of the present invention, or the lithium secondary cell of Comparative Example 2 that contains an ester that is different from the ester having two alkyl groups at the α-position carbon of the carbonyl group represented by the general formula (I). From those described above, it was revealed that the effects of the present invention were unique effects when the nonaqueous electrolytic solution in which an electrolyte salt is dissolved in a nonaqueous solvent, contains 0.01 to 40% by volume of the ester having two alkyl groups at the α-position carbon of the carbonyl group represented by the general formula (I) of the present invention. In addition, it is understood that the electrochemical properties improves in a further broader temperature range when the ester is combined with a specific cyclic carbonate or when the ester is combined with an ester represented by the general formula (II).

In addition, similar effects are exerted when using silicon (simple substance) for the negative electrode from the comparison of Example 11 with Comparative Example 3, and when using the lithium-containing olivine-type phosphoric acid iron salt for the positive electrode from the comparison of Example 12 with Comparative Example 4. Accordingly, it is described that the effects of the present invention are not effects depending on a specific positive electrode or negative electrode.

Furthermore, the nonaqueous electrolytic solution of the present invention also has effects of improving the discharge property in a broad temperature range of a lithium primary cell.

INDUSTRIAL APPLICABILITY

By using the nonaqueous electrolytic solution of the present invention, it is possible to obtain an energy storage device that is excellent in the electrochemical properties in a broad temperature range. Particularly, when the nonaqueous electrolytic solution of the present invention is used as a nonaqueous electrolytic solution for an energy storage device loaded in a hybrid electric automobile, a plug-in hybrid electric automobile, or a battery electric automobile etc., it is possible to obtain an energy storage device of which the electrochemical properties hardly decline in a broad temperature range.

The invention claimed is:

1. A nonaqueous electrolytic solution, comprising:
an electrolyte salt; and
a nonaqueous solvent,
wherein the nonaqueous electrolytic solution is prepared by dissolving the electrolyte salt in the nonaqueous solvent,
the nonaqueous solvent comprises 0.01 to 40% by volume of an ester having two alkyl groups at an α-position carbon of a carbonyl group, and
the ester is methyl 2-ethyl-3-methyl butyrate, ethyl 2-ethyl-3-methyl butyrate, 2-propenyl 2-ethyl-3-methyl butyrate, methyl 2-ethyl valerate, ethyl 2-ethyl valerate, propyl 2-ethyl valerate, butyl 2-ethyl valerate, 2-propynyl 2-ethyl valerate, methyl 2-propyl valerate, ethyl 2-propyl valerate, 2-propynyl 2-propyl valerate, methyl 2-ethyl hexanoate, ethyl 2-ethyl hexanoate, propyl 2-ethyl hexanoate, butyl 2-ethyl hexanoate, 2-propynyl 2-ethyl hexanoate, methyl di-iso-propyl acetate, ethyl di-iso-propyl acetate, or 2-propynyl di-iso-propyl acetate.

2. A nonaqueous electrolytic solution, comprising:
an electrolyte salt; and
a nonaqueous solvent,
wherein the nonaqueous electrolytic solution is prepared by dissolving the electrolyte salt in the nonaqueous solvent,
the nonaqueous solvent comprises 0.01 to 40% by volume of an ester having two alkyl groups at an α-position carbon of a carbonyl group, and
the ester is represented by formula (I):

wherein $R^1$ is a $C_1$ to $C_6$ alkyl group, a $C_2$ to $C_6$ alkenyl group, or a $C_2$ to $C_6$ alkynyl group in which at least one of hydrogen atoms is optionally substituted with a halogen atom, $R^2$ and $R^3$ are a $C_1$ to $C_6$ alkyl group in which at least one of hydrogen atoms is optionally substituted with a halogen atom, and $R^2$ and $R^3$ are optionally linked to each other to form a ring, and when $R^2$ and $R^3$ do not form a ring, $R^3$ is a $C_2$ to $C_6$ alkyl group in which at least one hydrogen atom is optionally substituted with a halogen atom, wherein the nonaqueous solvent further comprises a tertiary carboxylic acid ester and a chain carbonate, and a content of the tertiary carboxylic acid ester is greater than a content of the chain carbonate.

3. An energy storage device, comprising:
a positive electrode;
a negative electrode; and
the nonaqueous electrolytic solution of claim 1.

4. A nonaqueous electrolytic solution, comprising:
an electrolyte salt; and
a nonaqueous solvent,
wherein the nonaqueous electrolytic solution is prepared by dissolving the electrolyte salt in the nonaqueous solvent,
the nonaqueous solvent comprises 0.01 to 40% by volume of an ester having two alkyl groups at an α-position carbon of a carbonyl group, and
the ester is represented by formula (I):

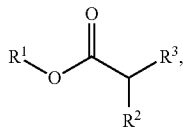

wherein $R^1$ is a $C_1$ to $C_6$ alkyl group, a $C_2$ to $C_6$ alkenyl group, or a $C_2$ to $C_6$ alkynyl group in which at least one of hydrogen atoms is optionally substituted with a halogen atom, $R^2$ and $R^3$ are a $C_1$ to $C_6$ alkyl group in which at least one of hydrogen atoms is optionally substituted with a halogen atom, and $R^2$ and $R^3$ are optionally linked to each other to form a ring, when $R^2$ and $R^3$ do not form a ring, $R^3$ is a $C_2$ to $C_6$ alkyl group in which at least one hydrogen atom is optionally substituted with a halogen atom, and wherein the ring is a 3- to 9-membered ring when $R^2$ and $R^3$ form the ring, and a total carbon number of $R^2$ and $R^3$ is 4 to 8 when $R^2$ and $R^3$ do not form the ring, wherein the nonaqueous solvent further comprises a tertiary carboxylic acid ester and a chain carbonate, and a content of the tertiary carboxylic acid ester is greater than a content of the chain carbonate.

5. The energy storage device of claim 3, wherein the positive electrode comprises a complex metal oxide with lithium, which comprises at least one selected from the group consisting of cobalt, manganese, and nickel, as a positive electrode-active material.

6. The energy storage device of claim 3, wherein the negative electrode comprises at least one selected from the group consisting of a lithium metal, a lithium alloy, a carbon material which is capable of absorbing and releasing lithium, tin, a tin compound, silicon, a silicon compound, and a lithium titanate compound as a negative electrode-active material.

7. The nonaqueous electrolytic solution of claim 1, wherein the nonaqueous solvent further comprises a pivalic acid ester.

8. The nonaqueous electrolytic solution of claim 2, wherein a volume ratio of the cyclic carbonate to the chain ester is 10:90 to 45:55.

9. The nonaqueous electrolytic solution of claim 2, wherein a volume ratio of the cyclic carbonate to the chain ester is 20:80 to 35:65.

10. The nonaqueous electrolytic solution of claim 9, wherein the tertiary carboxylic acid ester is a pivalic acid ester.

11. The nonaqueous electrolytic solution of claim 10, wherein the chain carbonate is dimethyl carbonate or diethyl carbonate.

12. The nonaqueous electrolytic solution of claim 4, wherein the tertiary carboxylic acid ester is a pivalic acid ester.

13. The nonaqueous electrolytic solution of claim 12, wherein the ester comprises the pivalic acid ester at a volume ratio of from 51% by volume to 95% by volume.

14. The nonaqueous electrolytic solution of claim 12, wherein the ester comprises the pivalic acid ester at a volume ratio of from 55% by volume to 85% by volume.

15. The nonaqueous electrolytic solution of claim 12, wherein the chain carbonate is dimethyl carbonate or diethyl carbonate.

* * * * *